TELEPHONE REPORTING SET

Original Filed Feb. 6, 1967 8 Sheets-Sheet

INVENTORS R.J. ANDREWS
G.C. FIELDS
H.K. THOMPSON
BY Henry L. Newman
ATTORNEY

TELEPHONE REPORTING SET

Original Filed Feb. 6, 1967 8 Sheets-Sheet 2

ALARM DETECTION CIRCUIT

ALARM DETECTION CIRCUIT

CONTROL CIRCUIT

INFORMATION STORAGE & ACCESSING CIRCUIT

FIG. 3A

| TIME SLOT | 1 | 2 | 3 | 4 | 5 | 6 | 7 | 8 | 9 | 10 |
|---|---|---|---|---|---|---|---|---|---|---|
| SECONDS | 0 1 2 3 4 5 6 7 8 9 10 11 12 13 14 15 16 17 18 19 20 21 22 23 24 25 26 27 28 29 30 | | | | | | | | | |
| TAPE TRACK | | | | | | | | | | |
| 1 DIAL | (4) (6) (4) (6) (0) (7) (9) (TRACK END TONES) (PULSING TONES) | | | | | | | | | |
| 2 IDENTIFICATION | THIS IS 582-2911 MURRAY HILL POWER SUB-STATION. THIS IS AN AUTOMATIC TELEPHONE CALL AND A RECORDING WHICH WILL REPEAT. | | | | | THIS IS 582-2911 MURRAY HILL POWER SUB-STATION. THIS IS AN AUTOMATIC TELEPHONE CALL AND A RECORDING WHICH WILL REPEAT. (TIME SLOT TONES) | | | | |
| 3 REPORT | (1) CCT. BKR. ONE IS OPEN | (2) CCT. BKR TWO IS OPEN | (3) CCT. BKR. THREE IS OPEN | (4) CCT. BKR. FOUR IS OPEN | (5) CCT. BKR. FIVE IS OPEN | (6) CCT. BKR SIX IS OPEN | (7) CCT. BKR. SEVEN IS OPEN | (8) CCT. BKR. EIGHT IS OPEN | (9) END OF REPORT | (10) THE CCTS ARE RECLOSED |
| 4 REPORT | (11) CCT BKR ELEVEN IS OPEN | (12) CCT. BKR TWELVE IS OPEN | (13) CCT. BKR. THIRTEEN IS OPEN | (14) CCT. BKR. FOURTEEN IS OPEN | (15) CCT. BKR. FIFTEEN IS OPEN | (16) CCT. BKR SIXTEEN IS OPEN | (17) CCT. BKR. SEVENTEEN IS OPEN | (18) CCT. BKR. EIGHTEEN IS OPEN | (19) END OF REPORT | (20) THE CCTS ARE RECLOSED |

TELEPHONE REPORTING SET
Original Filed Feb. 6, 1967 8 Sheets-Sheet 6
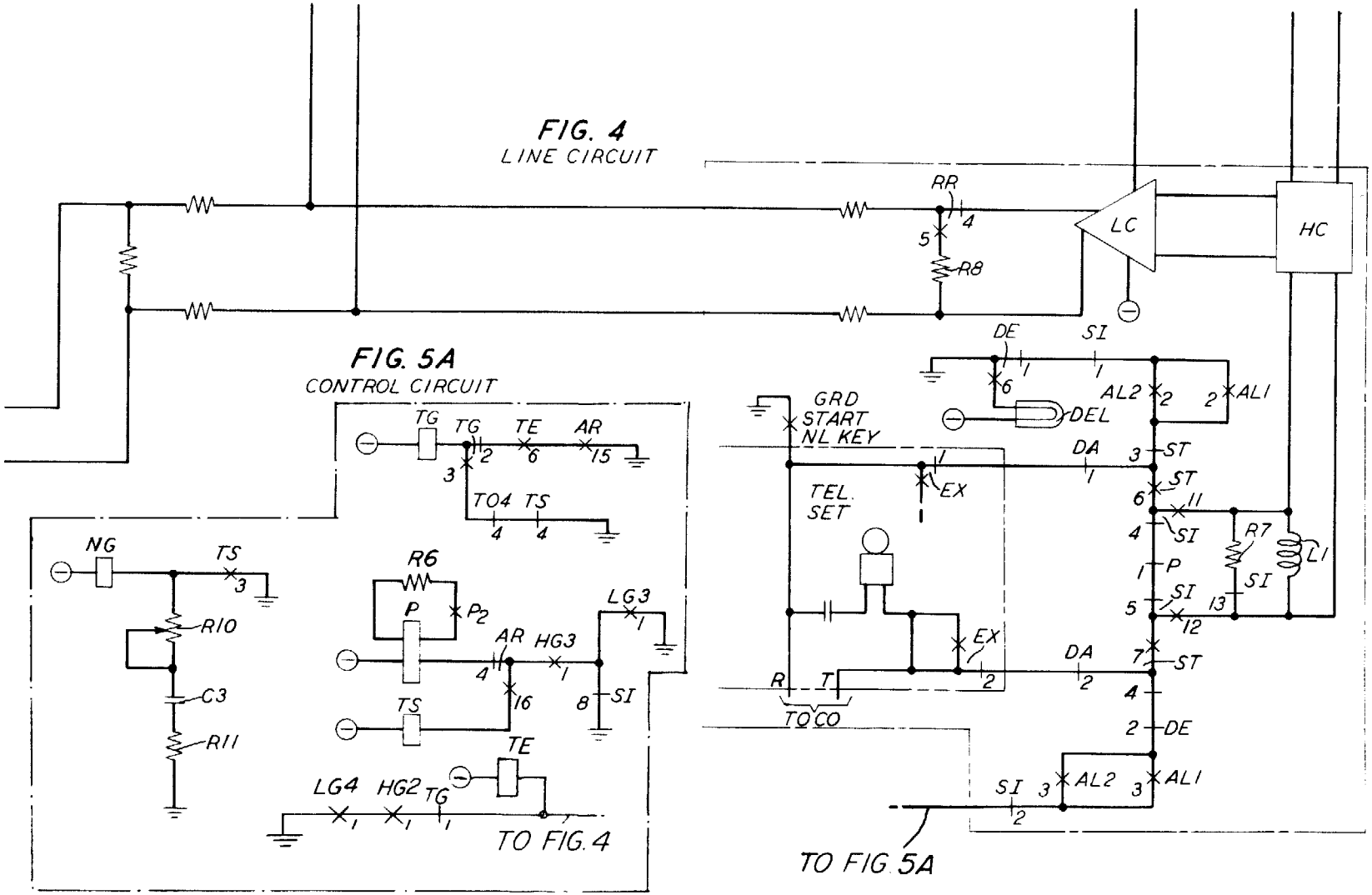

TELEPHONE REPORTING SET

Original Filed Feb. 6, 1967 8 Sheets-Sheet 7

TELEPHONE REPORTING SET
Original Filed Feb. 6, 1967 8 Sheets-Sheet 8
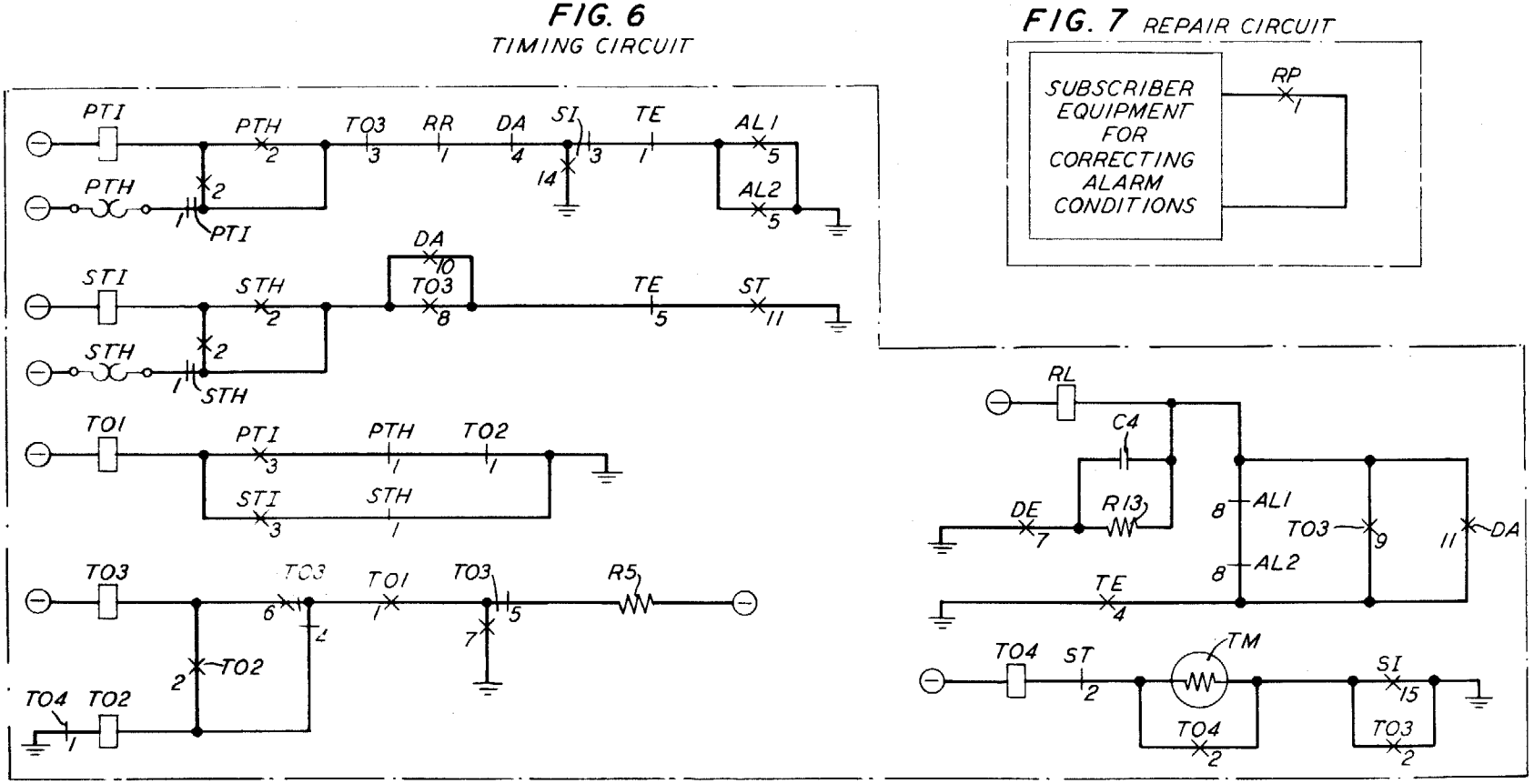

United States Patent Office

Re. 27,782
Reissued Oct. 9, 1973

27,782

TELEPHONE REPORTING SET

Raymond James Andrews, San Diego, Gary Conway Fields, Oakland, and Harold Kirkwood Thompson, San Anselmo, Calif., assignors to American Telephone and Telegraph Company, New York, N.Y.

Original No. 3,531,597, dated Sept. 29, 1970, Ser. No. 614,310, Feb. 6, 1967. Application for reissue Jan. 11, 1971, Ser. No. 105,229

Int. Cl. H04m *11/04*

U.S. Cl. 179—5 P 14 Claims

Matter enclosed in heavy brackets [ ] appears in the original patent but forms no part of this reissue specification; matter printed in italics indicates the additions made by reissue.

ABSTRACT OF THE DISCLOSURE

An alarm reporting telephone in which the closure of any one of a plurality of alarm responsive switches initiates the operation of a tape deck that selectively plays one of four tracks recorded on an endless loop of tape. Each track has information recorded thereon in the form of multifrequency tone bursts and/or verbal statements. The multifrequency tone bursts are converted into corresponding switch closures by a multifrequency signal receiver to interrupt a telephone line so as to transmit pulses thereover corresponding to a predetermined telephone number, to cause the tape deck to switch from one tape track to another, and to reset thermal timers. The verbal statements are transmitted out on the telephone line to the called station which exercises control over the reporting telephone by the transmission thereto of three different multifrequency tones. One of the three multifrequency tones initiates the operation of equipment for correcting the alarm condition, while a second multifrequency tone initiates the shutting down of the reporting telephone.

FIELD OF THE INVENTION

This invention relates to the field of telephone communications and within that field to the area of alarm reporting over telephone circuits.

Telephone reporting sets have been developed for surveillance at unattended customer locations. These reporting sets are used to perform surveillance of the unattended premises themselves, such as for fire or burglary, or to perform surveillance of equipment located at the unattended premises, such as for ineffective operation or failure of the equipment. The surveillance is carried out by monitoring the premises or equipment for the occurrence of particular preselected conditions, hereinafter referred to as alarm conditions. When such a condition occurs, the reporting set responds by calling a supervisory station and informing the supervisory station of the source of the call and the occurrence of the condition.

DESCRIPTION OF THE PRIOR ART

Heretofore the monitoring capability of reporting sets has been quite limited, most sets responding to the occurrence of only a single alarm condition, or where responding to more than one condition being unable to identify which particular condition has in fact occurred. Only a few reporting sets have the capability of responding to as many as three different conditions and identifying them individually to the supervisory station.

Furthermore, only the reporting set disclosed in the copending application of J. F. Ritchey-L. D. Tate-R. E. Waddell, Ser. No. 554,431, filed June 1, 1966, includes means for permitting the supervisory station to activate subscriber owned equipment that may take corrective action with respect to the alarm condition that has occurred.

In that reporting set, however, it is necessary for the supervisory station to call the reporting set in order to initiate the operation of this equipment. The operation cannot be initiated at the time that the reporting set first calls the supervisory station to inform it of the occurrence of the condition.

SUMMARY OF THE INVENTION

A reporting set is herein disclosed that is capable of monitoring a multiplicity of alarm conditions and when one or more of the conditions do occur being able to identify to the supervisory station specifically what they are.

In addition, a reporting set is herein disclosed that is capable of initiating the operation of subscriber owned equipment responsive to a command signal transmitted by the supervisory station at the time that the supervisory station is being informed of the alarm conditions that have occurred.

The reporting set of the present invention monitors up to sixteen different alarm conditions. When one or more of the conditions occur, the reporting set seizes the telephone line it is connected to and upon placement of dial tone on the line, the reporting set dials the telephone number of the supervisory station. Then for a period of time following the completion of the dialing the reporting set repetitively transmits a recorded message identifying itself.

Upon answering the call from the reporting set, the supervisory station exercises control over the reporting set by three different command signals. These command signals are identified as report, repair, and disable.

The report command signal is transmitted first, and it causes the reporting set to terminate the transmission of the station identification and initiate the transmission of an alarm report. The alarm report informs the supervisory station which alarm conditions among those being monitored have actually occurred.

The repair command signal is transmitted after the alarm report has been heard, and it initiates the operation of subscriber equipment that may take corrective action with respect to the alarm conditions that have occurred. If the corrective action is partially successful, the reporting set announces only those conditions that continue to exist. If the corrective action is completely successful, the reporting set informs the supervisory station of this fact and then drops the telephone line and restores to a standby state.

The disable command signal is transmitted last, and it is used when the corrective action taken responsive to the repair command signal is not completely successful. In response to the disable command signal, the reporting set shuts down and ceases to respond to the existing alarm conditions or to the occurrence of any additional alarm conditions.

The reporting set automatically drops the telephone line and initiates another call after a preselected interval of time elapses during the transmission of the station identification without the reporting set receiving a report command signal. The same sequence occurs if a preselected interval of time elapses during the transmission of the alarm report without the reporting set receiving a report or repair command signal. This assures that the supervisory station does in fact have the opportunity to be informed of the alarm conditions causing the reporting set to respond.

BRIEF DESCRIPTION OF THE DRAWINGS

FIGS. 2A and 2B show the alarm detection circuit;

FIG. 3A shows an illustrative tape recording arrangement;

FIG. 4 shows the line circuit;

FIGS. 5A, 5B, and 5C show the control circuit;

FIG. 6 shows the timing circuit;

FIG. 7 shows the repair circuit; and

FIGS. 8A and 8B show how FIGS. 2A, 2B, 3, 4, 5A, and 5B should be placed with respect to one another to provide an operative arrangement.

Figure 1:
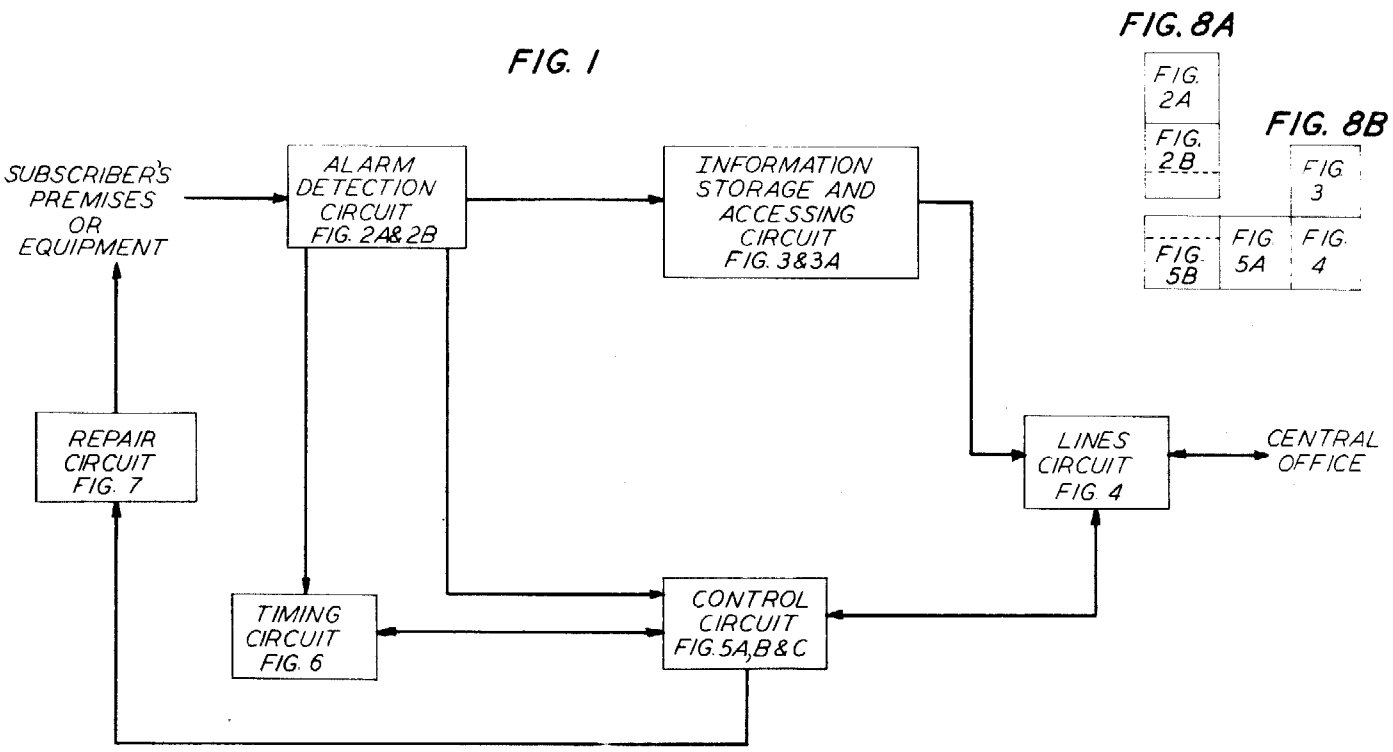
FIG. 1 is a block diagram illustrating the cooperation between various functional circuits of the telephone reporting set of this invention.

The schematic circuit diagrams employ a type of notation referred to as "detached contact" in which an *x* represents a normally open contact of a relay and a vertical bar represents a normally closed contact of a relay. "Normally" refers to the deenergized condition of a relay and of course a contact changes state when the relay with which it is associated is energized. The principles of this type of notation are described in an article entitled "An Improved Detached Contact Type of Circuit Drawing" by F. T. Meyer in the September 1955 publication of the American Institute of Electrical Engineers Transactions, Communications and Electronics, volume 74, pages 505–513.

In addition, functional designations have generally been used for the names of the various components, the referenec characters associated with the schematic representation of the components being abbreviations of these functional designations. For example, the alarm relays appearing in FIG. 2A have the reference characters AL1 and AL2. The same reference characters followed by a subscription are used to designate the contacts of the relays, each contact of a relay having its own individual subscript.

DESCRIPTION OF THE ILLUSTRATIVE EMBODIMENT

Referring to the block diagram in FIG. 1, the telephone reporting set of the present invention may be arranged in six functional circuits. These circuits consist of an alarm detection circuit (FIGS. 2A and 2B), an information storage and accessing circuit (FIG. 3), a line circuit (FIG. 4), a control circuit (FIGS. 5A, 5B and 5C), a timing circuit (FIG. 6), and a repair circuit (FIG. 7). The interaction between these circuits is represented by the arrows extending between the blocks of the diagram.

Figure 2A:
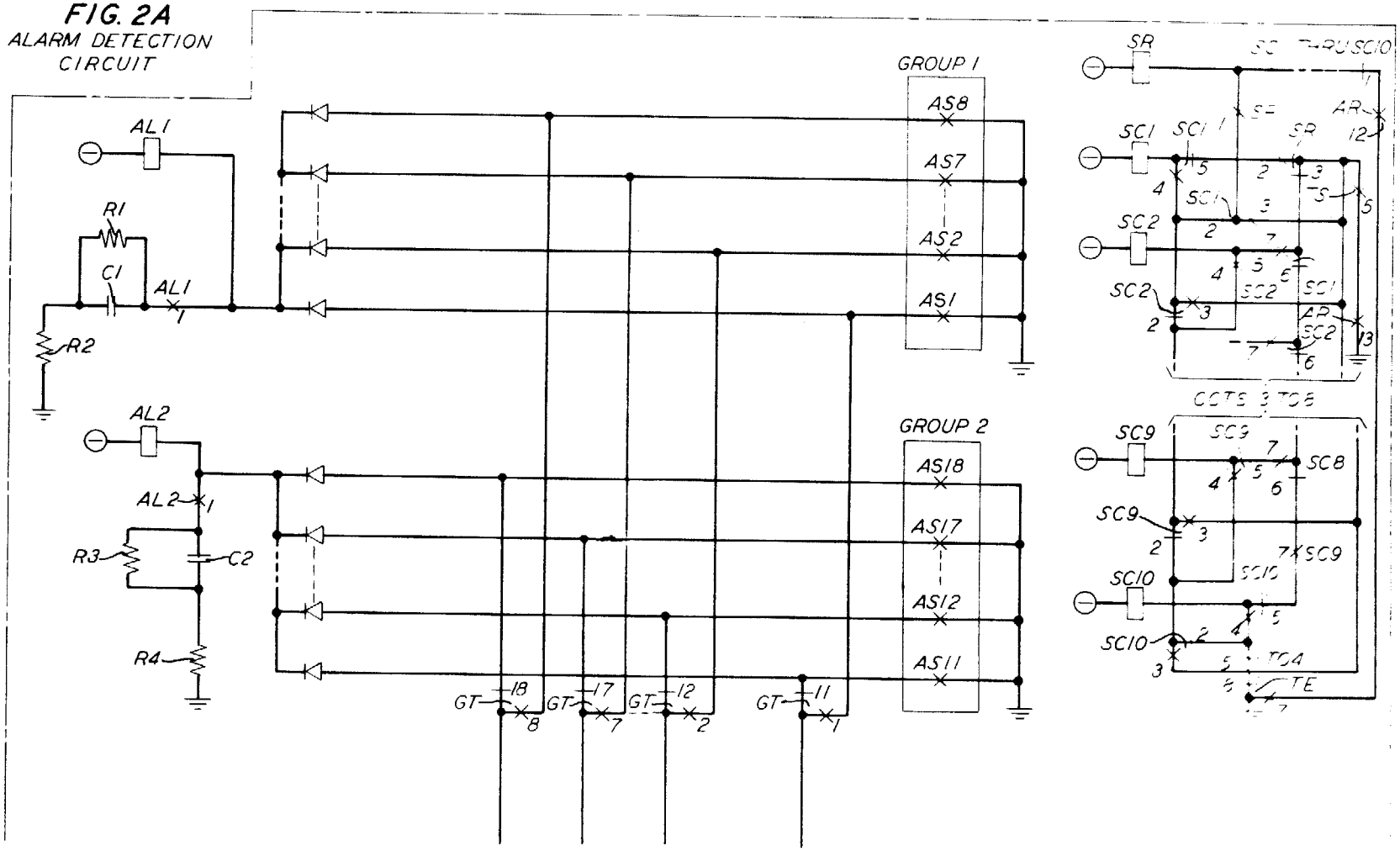
Figures 2B, 5B:
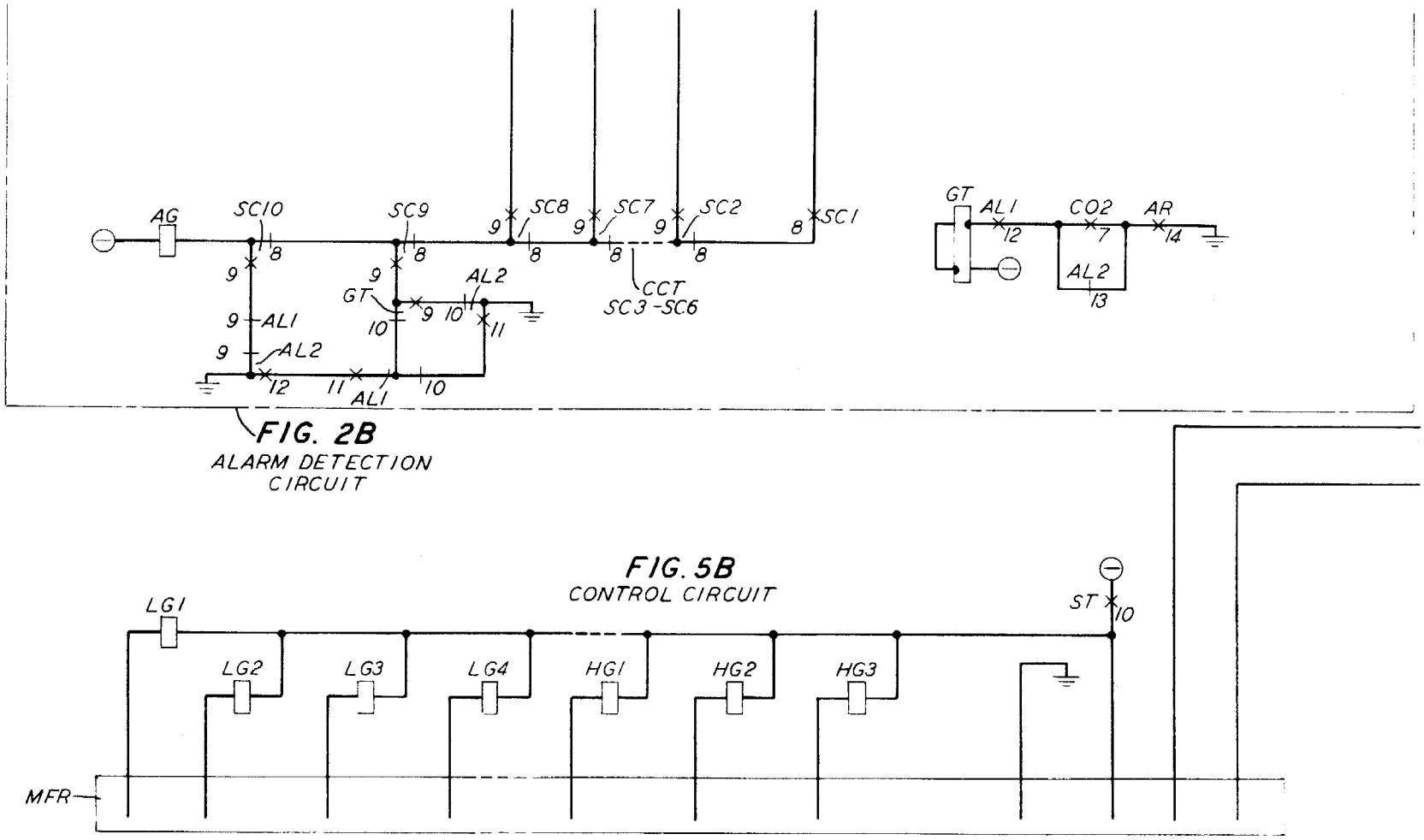

The alarm detection circuit shown in FIGS. 2A and 2B operates in conjunction with certain sensing apparatus of the subscriber. This apparatus comprises means for monitoring the premises or equipment of the subscriber for the occurrence of the alarm conditions the subscriber is interested in detecting and a plurality of normally open alarm switches that are actuated by the monitoring means. Each alarm switch is associated with an individual alarm condition and is closed by the monitoring means upon the occurrence of the alarm condition with which it is associated. Furthermore, each alarm switch either closes when the condition occurs and reopens when it stops, or it is latched closed when the condition occurs and is only unlatched responsive to a particular signal from a supervisory station.

The present embodiment includes sixteen of these alarm switches and is therefore capable of monitoring up to sixteen different conditions. The alarm switches are of the latching variety and are identified as AS1 through AS8 and AS11 through AS18. As shown in FIG. 2A, the the alarm switches are divided into two groups, the switches AS1 through AS8 being in one group and the switches AS11 through AS18 being in the second group.

The alarm detection circuit further includes an alarm relay AL1 that is associated with the first group of alarm switches AS1 through AS8 and an alarm relay AL2 that is associated with the second group of alarm switches AS11 through AS18. Finally, the alarm detection circuit includes a stepping chain of relays SC1 through SC10 that in combination with a steering relay SR, a group transfer relay GT and the alarm switches AS control the operation of an alarm gate relay AG. The alarm gate relay AG, in turn, exercise control over the information storage and accessing circuit during the alarm reporting period.

Figure 3:
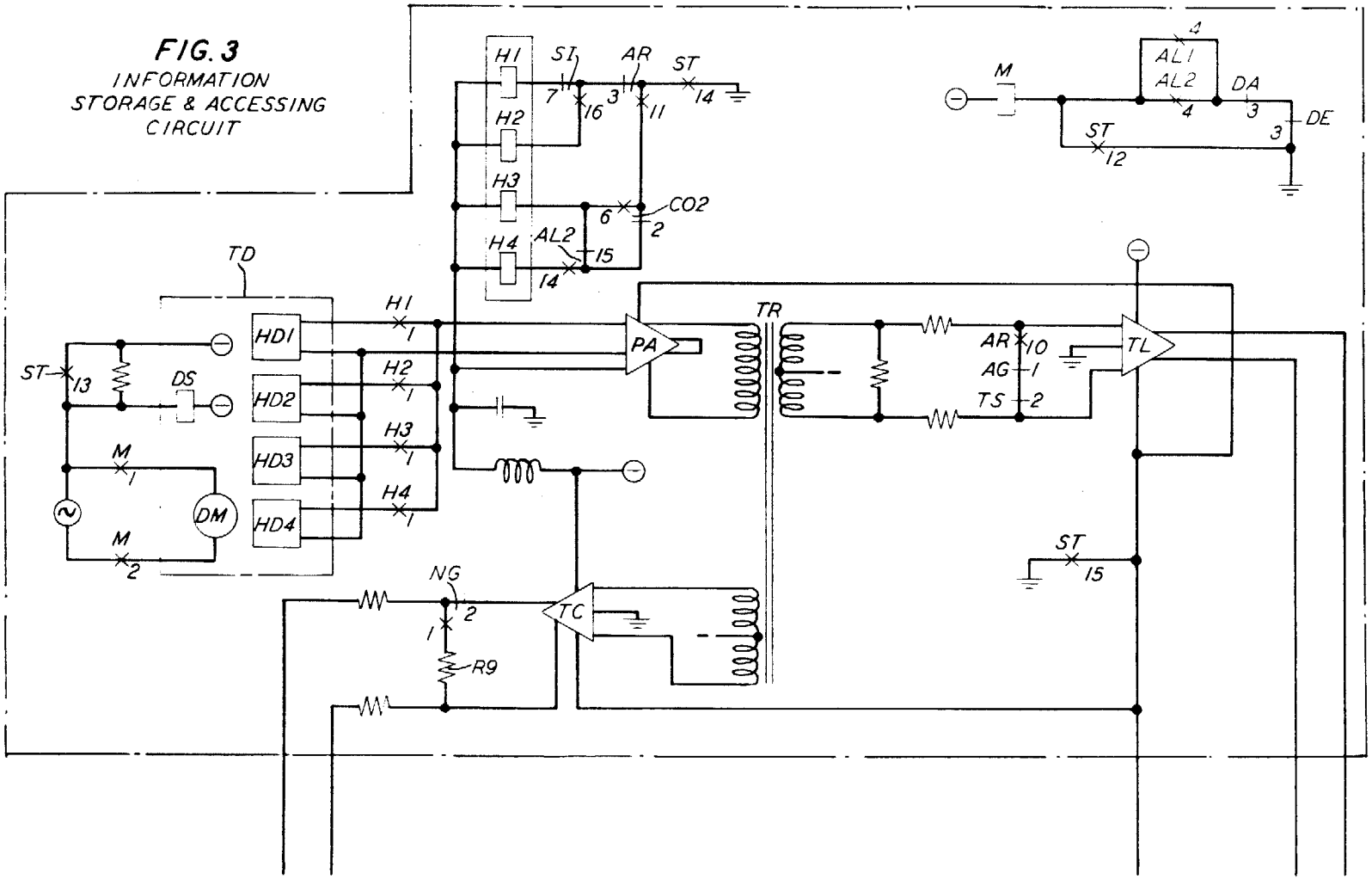
FIG. 3 shows the information storage and accessing circuit.

The information storage and accessing circuit shown in FIG. 3, includes a tape deck TD having four heads HD1 through HD4, a drive motor DM, and a drive solenoid DS. The heads HD1 through HD4 each scan one quarter of the width of the tape. The drive motor DM when energizer rotates a tape capstan (not shown) while the drive solenoid when energized actuates a pressure roller (not shown) to press the tape against the capstan. Thus, movement of the tape past the heads HD1 through HD4 does not occur until both the drive motor DM and the drive solenoid DS are energized. Energization of the drive motor DM is under the control of a motor relay M. A suitable commercial tape deck is marketed by Viking of Minneapolis as Viking Model 38QQ.

The tape deck TD operates in conjunction with a continuous loop of tape advantageously contained in a tape cartridge. The loop of tape is of a length such that one complete traversal of the tape takes 30 seconds. Four tracks are recorded on the tape, and FIG. 3A shows the manner in which the four tracks are utilized.

The first track of the tape, referred to as the dial track, has the telephone number of a supervisory station recorded thereon in the form of repetitive tone bursts of a particular pair of frequencies. The pair of frequencies used are those generated by a Touch-Tone dial when the 9 button is depressed, i.e., 1209 and 852, and as employed in the dial track this multifrequency signal will be referred to as a pulse tone. As hereinafter described, during the time that the dial track is being played back, the pulse tone bursts are converted into dial pulses on a one to one basis. Thus each digit comprises a series of pulse tone bursts corresponding in number to the value of the digit.

The last digit of the telephone number is followed by a tone burst of a different pair of frequencies, this pair of frequencies being that generated by a Touch-Tone dial when the 0 button is depressed, i.e., 1336 and 941. This multifrequency signal, hereinafter referred to as a track end tone, serves to indicate whether the tape is being properly scanned by the heads. Once the deck motor DM and the deck solenoid DS have both been energized, the absence of this signal for a particular period of time results in the shutting down of the reporting set. Thus, a track end tone burst is also recorded at the end of each of the other three tracks.

The second track of the tape, referred to as the identification track, has a repetitive announcement recorded thereon identifying the reporting set to the supervisory station. Where the reporting set calls the supervisory station through a central office having centralized automatic message accounting, the reporting set must also identify itself by telephone number to a telephone operator. As indicated by the illustrative announcement in FIG. 3A, for the purposes of the present disclosure, it will be assumed that the reporting set is employed at a power substation.

The third and fourth tracks of the tape, referred to as the report tracks, are each divided into ten time slots of three seconds each. Each time slot has a multifrequency tone burst recorded at the beginning thereof that has the same frequencies as the pulse tone, but as used in the report tracks, this signal will be referred to as a time slot tone. Each time slot tone is followed by a particular announcement. The first eight time slots of each track have announcements reporting the occurrence of the individual conditions being monitored, the first eight time slots of track 3 respectively corresponding to the alarm conditions associated with the first group of alarm switches AS1 through AS8 and the first eight time slots of track 4 respectively corresponding to the alarm conditions associated with the second group of alarm switches AS11 through AS18. The ninth time slot of both tracks has an end of report announcement, while the tenth time slot of both tracks has an announcement indicating successful correction of the conditions that have occurred.

As indicated by the illustrative announcements in FIG. 3A, in the present embodiment it will be assumed that the reporting set monitors sixteen normally closed circuit breakers, the circuit breakers being numbered one through eight and eleven through eighteen to correspond to the alarm switches AS. The opening of any of the circuit breakers results in the closing of the alarm switch AS associated therewith, the alarm switches reopening upon the reclosure of the circuit breakers.

Referring again to FIG. 3, the heads HD1 through HD4 are respectively connected to a preamplifier PA under the control of head relays H1 through H4, only one head being connected to the preamplifier at any time. The output of the preamplifier PA is coupled through a transformer TR to both a tape to line amplifier TL and a tape to control amplifier TC. The tape to line amplifier TL is connected to the line circuit while the tape to control amplifier TC is connected to the control circuit.

The line circuit, shown in FIG. 4, includes a pair of line conductors that are connected to the ring and tip conductors of a ground start telephone line. A telephone set TS is connectable across the line conductors by the manual operation of an exclusion switch EX. In addition, a direct current pulsing path including a normally closed contact $P_1$ is connectable across the line conductors by the operation of a start relay ST of the control circuit. Finally, a direct current terminating path comprising an inductor L1 and an alternating current coupling path comprising a 2-wire-4-wire hybrid coil HC are connectable across the line conductors by the operation of a station identification relay SI of the control circuit.

The line conductors in combination with the hybrid coil HC serve to connect the information storage and accessing circuit to the telephone line so that information may be transmitted out on the line to the supervisory station. It also serves in combination with a line to control amplifier LC to connect the supervisory station to the control circuit so that command signals transmitted by the supervisory station can direct the operation of the reporting set.

Three command signals are employed in the present embodiment, and each comprises a multifrequency tone of a particular pair of frequencies. The first command signal, identified as the report command signal, comprises the pair of frequencies generated by a Touch-Tone dial when the 1 button is depressed, i.e., 1477 and 697. The second command signal, identified as the repair command signal, comprises the pair of frequencies generated by a Touch-Tone dial when the 2 button is depressed, i.e., 136 and 697, and the third command signal, identified as the disable command signal, comprises the pair of frequencies generated by a Touch-Tone dial when the 3 button is depressed, i.e., 1209 and 697. The supervisory station is advantageously equipped with a Touch-Tone telephone and therefore can employ the dial thereof to generate these command signals.

Figure 5C:
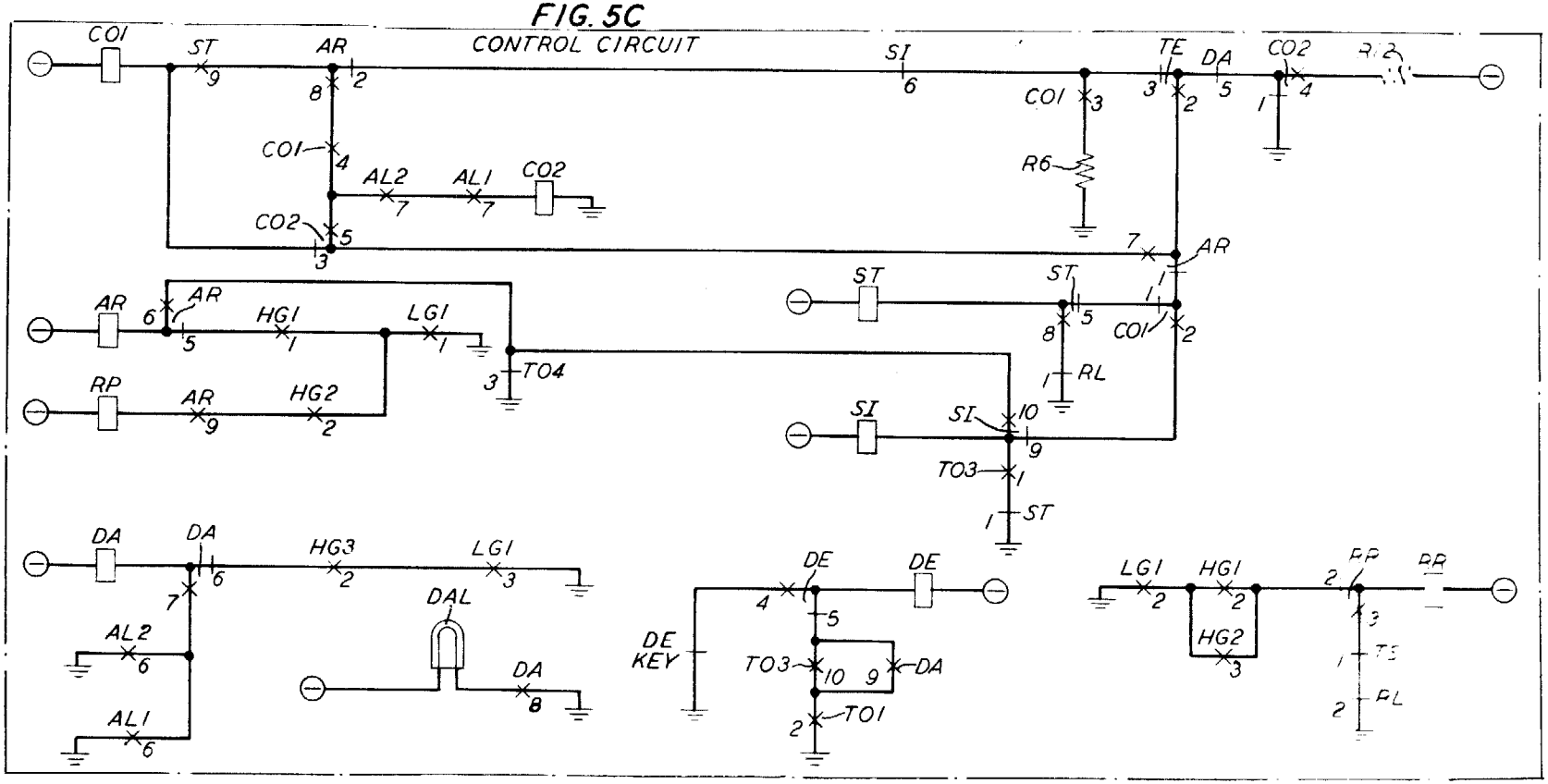

The control circuit, shown in FIGS. 5A, 5B, and 5C includes a multifrequency signal receiver MFR that receives the multifrequency tones transmitted by the information storage and accessing circuit 22 and the multifrequency tones transmitted by the supervisory station over the telephone line and amplified by the line circuit 24. As mentioned above, these multifrequency tones are those generated by a Touch-Tone dial upon the operation of the pushbuttons thereof. Consequently, as set forth in Pat. 3,184,554, issued to L. A. Meacham and F. West on May 18, 1965, each multifrequency tone comprises a tone from a band of relatively high frequencies and a tone from a band of relatively low frequencies.

In the multifrequency signal receiver MFR, incoming signals are split into two groups by a pair of band elimination filters, each of which rejects a respective unwanted group of frequencies. Each of the two signal groups is in turn applied to a respective limiter whose output is a square wave containing the fundamental and odd harmonics of the dominating frequency component of the incoming signal. Each of the two limiter outputs is in turn applied to a respective group of tuned circuits, each of the tuned circuits being resonant at a preselected one of the signal frequencies. Outputs from the tuned circuits are used to operate a pair of relays, one from a group of four low group relays LG1 through LG4 and one from a group of three high group relays HG1 through HG3, the relays being operated for a period of 45 milliseconds.

The receipt of the report command signal results in the operation of the relays LG1 and HG1; the receipt of the repair command signal results in the operation of the LG1 and HG2 relays; and the receipt of the disable command signal results in the operation of the relays LG1 and HG3. The receipt of the pulse tone or the time slot tone results in the operation of the relays LG3 and HG3, and the receipt of the track end tone results in the operation of the relays LG4 and HG2. A more detailed description of a multifrequency signal receiver of this type is disclosed in Pat. 3,076,059, issued to L. A. Meacham and L. Schenker on Jan. 29, 1963.

In addition to the multifrequency signal receiver MFR, the control circuit includes relays that respond directly or indirectly to the operation of the high group and low group relays HG and LG of the multifrequency receiver. The relays shown in FIG. 5A consist of a noise guard relay NG, tone guard relay TG, a pulsing relay P, a time slot relay TS and a track end relay TE. The relays shown in FIG. 5C consist of a pair of control relays CO1 and CO2, an alarm report relay AR, a repair relay RP, the start relay ST, the station identification relay SI, a disable relay DA, a deactivate relay DE, and a report repair relay RR.

The timing circuit, shown in FIG. 6, includes a primary thermal relay PTH that operates in conjunction with a primary timer relay PTI to provide primary timing and a secondary thermal relay STH that operates in conjunction with a secondary timer relay STI to provide secondary timing. In both primary and secondary timing the relationship between each thermal relay and its associated timer relay is basically the same, and therefore the following description of the relationship between the primary thermal relay PTH and the primary timer relay PTI will also serve to describe the relationship between the secondary thermal relay STH and the secondary timer relay STI.

The primary thermal relay PTH has a normally closed contact $PTH_1$ that is in the energizing path of a timeout relay TO1 and a normally open contact $PTH_2$ that is in the energizing path of the primary timer relay PTI. In addition, the primary timer relay PTI has a normally closed contact $PTI_1$ that is in the energizing path of the primary thermal relay PTH, a normally open contact $PTI_2$ that is in parallel with the contact $PTH_2$ of the thermal relay, and a normally open contact $PTI_3$ that is in the energizing path of the timeout relay TO1.

When the primary thermal relay PTH is energized, a heating period is initiated, and after the lapse of a period of time during which heat accumulates, the contact $PTH_1$ opens and the contact $PTH_2$ closes in sequence. The closure of the contact $PTH_2$ energizes the primary timer relay PTI, and the energized timer relay opens the contact $PTI_1$ to deenergize the primary thermal relay PTH. In addition, the energized primary timer relay PTI closes the contact $PTI_2$ to place a shunt around the closed contact $PTH_2$ and closes the contact $PTI_3$ in the path of the timeout relay TO1. The deenergization of the primary thermal relay PTH terminates the heating period and initiates a cooling period and immediately thereafter the contact $PTH_2$ reopens. The primary timer relay PTI, however, remains energized through its own closed contact $PTI_2$. If at any time during the cooling period the primary timer relay PTI is deenergized by the opening of any of the closed contacts in its energizing path, the contact $PTI_2$ reopens and maintains the relay in a deenergized state. In addition, the contact $PTI_1$ recloses and energizes the thermal relay PTH. The heating period is thereby reinitiated and the timing cycle essentially starts anew.

If, on the other hand, the timer relay TI remains energized for the entire cooling period, at the end of the period, the contact $PTH_1$ recloses and energizes the timeout relay TO1 to complete primary timing. Primary timing consists of a heating period of 35 seconds and a cooling period of 115 seconds while secondary timing consists of a heating period of 11 seconds and a cooling period of 34 seconds.

The timing circuit further includes timeout relays TO2, TO3, and TO4, and a release relay RL that respond to the completion of primary and/or secondary timing under certain conditions.

The final circuit of the reporting telephone comprises the repair circuit, shown in FIG. 7. The repair circuit comprises subscriber owned equipment that is energized responsive to the repair command signal transmitted by the supervisory station. The subscriber owned equipment acts to correct the alarm conditions that have occurred, and if the attempt is successful, the alarm switch AS associated with the corrected alarm conditions reopens. Of course, if any alarm condition is not successfully corrected, the alarm switch AS associated therewith remains closed.

In the present embodiment the subscriber's repair equipment comprises a motor driven actuator that acts to sequentially close all of the circuit breakers. The circuit breakers that are already closed are unaffected. However, the circuit breakers that were open are thereby closed, and if the condition which caused a particular circuit breaker to open does not still exist, the circuit breaker will remain closed. If, on the other hand, the condition continues to exist, the circuit breaker will immediately reopen.

DESCRIPTION OF OPERATION

The operation of the telephone reporting set will now be described and it will be assumed that operation is initiated by the opening of the circuit breakers 2, 8, and 12. The description will refer to the figure appearing in parenthesis until a subsequent figure in parenthesis is provided.

Seizure of telephone line

The opening of the circuit breakers 2, 8, and 12 results in the closing of the alarm switches AS2 (FIG. 2A) and AS8 in the first group and the closing of the alarm switch AS12 in the second group. The closed alarm switches AS2 and AS8 connect the alarm relay AL1 to ground while the closed alarm switch AS12 connects the alarm relay AL2 to ground. Both alarm AL1 and AL2 relays are thereby energized and the contacts thereof operated.

Closed contacts $AL1_1$ and $AL2_1$ respectively provide slow release paths to ground for the alarm relays AL1 and AL2. The path for the alarm relay AL1 is through resistors R1 and R2, the resistor R1 being connected in parallel with a capacitor C1 and the path for the alarm relay AL2 is through resistors R3 and R4, the resistor R3 being connected in parallel with a capacitor C2.

Closed contacts $AL1_2$ and $AL2_2$ (FIG. 4) cause the reporting set to seize the ground start telephone line by applying ground to the ring conductor, a path to ground being provided through closed contacts $EX_1$, $DA_1$, $ST_3$, $AL1_2$, $AL2_2$, $SI_1$, and $DE_1$, and closed contacts $AL1_3$ and $AL2_3$ connect the track end relay TE to the tip conductor, a path to the tip conductor being provided through closed contacts $SI_2$, $AL1_3$, $AL2_3$, $DE_2$, $ST_4$, $DA_2$, and $EX_2$. Closed contacts $AL1_4$ and $AL2_4$ (FIG. 3) in combination with closed contacts $DA_3$ and $DE_3$ energize the motor relay M, and closed contacts $AL1_5$ and $AL2_5$ (FIG. 6) in combination with closed contacts $TE_1$, $SI_3$, $DA_4$, $RR_1$, $TO3_3$, and $PTI_1$, energize the primary thermal relay PTH to initiate primary timing.

The remainder of the operated contacts perform no function at this time. Closed contacts $AL1_6$ and $AL2_6$ (FIG. 5C) are in the path to ground of the disable relay DA; closed contacts $AL1_7$ and $AL2_7$ are in the energizing path of the control relay CO2; and open contacts $AL1_8$ and $AL2_8$ (FIG. 6) are in a path to ground of the release relay RL. Open contacts $AL1_3$ (FIG. 2B), $AL1_{10}$, $AL2_9$, and $AL2_{10}$, and closed contacts $AL1_{11}$, $AL2_{11}$, and $AL2_{12}$ are in paths to ground of the alarm gate relay AG while closed contact $AL1_{12}$ and open contact $AL2_{13}$ are in the path to ground of the group transfer relay GT. Finally, closed contact $AL2_{14}$ (FIG. 3) and open contact $AL2_{15}$ are in paths to ground of the head relays H3 and H4. It is seen from the above that many of the contacts of the alarm relays AL1 and AL2 are redundant so that the same result ensues whether one or both of the relays are energized.

The energized motor relay M closes the contacts $M_1$ and $M_2$ thereof, and they connect the tape deck motor DM to a source of power and turn it on. The reporting set then waits for the central office to respond to the seizure of the ground start telephone line by returning dial tone and applying ground to the tip conductor.

Failure to receive dial tone

If for some reason the central office does not return dial tone within approximately 150 seconds of the seizure of the telephone line, the reporting set drops the telephone line and tries again. This result occurs because primary timing is completed at the end of this period of time, and in the manner set forth in the description of the timing circuit (FIG. 6), the open contact $PTH_1$ of the primary thermal relay PTH recloses and in combination with the closed contacts $PTI_3$ and $TO2_1$ energizes the timeout relay TO1. Contact $TO1_1$ is thereby closed and in combination with closed contacts $TO4_1$, $TO3_4$, $TO3_5$, and resistor R5 completes the energization path of the timeout relay TO2.

The energization of the timeout relay TO2 opens contact $TO2_1$ to deenergize the timeout relay TO1 and closes contact $TO2_2$ to combine with closed contact $TO4_1$ to energize the timeout relay TO3, contact $TO1_1$ reopening to interrupt the previous energizing path of the timeout relay TO2. Contact $TO3_1$ (FIG. 5C) closes and in combination with closed contact $ST_1$ energizes the station identification relay SI, and contact $TO3_2$ (FIG. 6) closes and in combination with closed contact $ST_2$ and thermistor TM connects the timeout relay TO4 to ground. Finally, contact $TO3_3$ opens to deenergize the primary timer relay PTI.

The energized station identification relay SI drops the telephone line, contact $SI_1$ (FIG. 4) opening to interrupt the path of ring conductor to ground and contact $SI_2$ opening to interrupt the energizing path of the track end relay TE through the tip conductor. The latter is necessary since dial tone may be provided subsequent to the completion of primary timing, ground being at the same time applied to the tip conductor and energizing the track end relay TE.

Approximately two seconds later thermistor TM (FIG. 6) conducts and the timeout relay TO4 is energized. Contact $TO4_2$ closes and shunts the thermistor TM, and contact $TO4_1$ opens and deenergizes the timeout relays TO2 and TO3. Contact $TO3_1$ (FIG. 5C) thereupon reopens and deenergizes the station identification relay SI.

Furthermore, contact $TO3_2$ (FIG. 6) reopens and deenergizes the timeout relay TO4, while contact $TO3_3$ recloses in the energizing paths of the primary timer and thermal relays PTI and PTH and reinitiates primary timing. The deenergized station identification relay recloses contacts $SI_1$ and $SI_2$ (FIG. 4) in the paths of the ring and tip conductors, respectively, and the telephone line is seized again to make another try for dial tone.

Receiving of dial tone

In the usual case dial tone is provided shortly after ground is applied to the ring conductor of the ground start telephone line, and as indicated above, ground is applied to the tip conductor at the central office at the same time that dial tone is provided. The track end relay TE is thereupon energized and contact $TE_1$ (FIG. 6) opens to interrupt the energization of the primary thermal relay PTH. In addition, contact $TE_2$ (FIG. 5C) closes and in combination with closed contacts $CO2_1$, $DA_5$, $AR_1$, $CO1_1$, and $ST_5$, energizes the start relay ST.

Contacts $ST_3$ and $ST_4$ (FIG. 4) open and respectively interrupt the terminating paths of the ring and tip conductors, the track end relay TE being thereby deenergized, while contacts $ST_6$ and $ST_7$ close and in combination with closed contacts $SI_4$, $P_1$, and $SI_5$, provide a path across the ring and tip conductors that maintains the seizure of the telephone line.

Contact $ST_8$ (FIG. 5C) closes and in combination with closed contact $RL_1$ provides a second energizing path for the start relay ST, and contact $ST_5$ thereafter opens to interrupt the first energizing path. Contact $ST_1$ opens in an energizing path of the station identification relay SI, contact $ST_9$ closes in an energizing path of the control relay CO1, and contact $ST_{10}$ (FIG. 5B) closes to provide power for the multifrequency receiver MFR.

Contact $ST_2$ (FIG. 6) opens in the energizing path of the timeout relay $TO_4$ and contact $ST_{11}$ closes in the energizing path of the secondary thermal and timer relays STH and STI. Contact $ST_{12}$ (FIG. 3) closes to provide an alternate energizing path for the motor relay M and contact $ST_{13}$ closes to energize the tape deck solenoid DS whereupon the tape commences to move past the heads HD1 through HD4. In addition, contact $ST_{14}$ closes and in combination with closed contacts $AR_3$ and $SI_7$ energizes head relay H1, contact $H1_1$ closing to connect the head HD1 to the preamplifier PA. Finally, contact $ST_{15}$ closes and energizes the preamplifier PA, the tape to line amplifier TL, the tape to control amplifier TC, and the line to control amplifier LC (FIG. 4).

The deenergization of the track end relay TE recloses contact $TE_1$ (FIG. 6) in the energizing path of the primary thermal and timer relays PTH and PTI to reinstate primary timing. Also contact $TE_3$ (FIG. 5C) recloses which with closed contacts $ST_9$, $AR_2$, $SI_6$, $DA_5$, and $CO2_1$ energizes the control relay CO1. Contact $CO1_2$ thereupon closes in the energizing path of the station identification relay SI, and contact $CO1_3$ closes to provide in combination with resistor R6 an alternate energization path for the control relay CO1.

Dialing of supervisory station

With the head HD1 (FIG. 3) connected to the preamplifier PA, track 1 of the tape (FIG. 3A) is scanned. The repetitive pulse tones recorded on track 1 are amplified by the preamplifier PA (FIG. 3) and then coupled by the transformer TR to the tape to control amplifier TC for further amplification. The output of the tape to control amplifier TC is connected to the multifrequency receiver MFR (FIG. 5B) and each time a pulse tone is received thereby, the low group relay LG3 and the high group relay HG3 are briefly energized.

Contacts $LG3_1$ and $HG3_1$ (FIG. 5A) respectively close responsive to the energization of the low and high group relays LG3 and HG3, and these two contacts in combination with closed contact $AR_4$ ostensibly serve to energize the pulsing relay P. However, since the pulse tones occur in rapid succession, the contact $LG3_1$ is shorted by closed contact $SI_8$ to eliminate the possibility of any time difference in the opening and closing of the contacts $HG3_1$ and $LG3_1$ from interfering with the energization of the pulsing relay P.

The energized pulsing relay P opens contact $P_1$ (FIG. 4) thereof to interrupt the telephone line and transmit a pulse thereover. In addition, the energized pulsing relay P closes contact $P_2$ thereof to place a resistor R6 across a winding of the relay so as to provide a proper make and break timing of the pulse. Thus each pulse tone recorded on the tape produces one dial pulse. The pulse tones are spaced (FIG. 3A) to provide groups of pulses corresponding to the digits of the telephone number of a supervisory station, which in this embodiment is 464 6079.

Transmission of station identification

Immediately after dial pulsing is completed, the track end tone recorded on track 1 is scanned by the head HD1 (FIG. 3) and the signal amplified by the preamplifier PA and tape to control amplifier TC and introduced to the multifrequency receiver MFR (FIG. 5B). The multifrequency receiver MFR responds by briefly energizing low group relay LG4 and high group relay HG2. Contacts $LG4_1$ and $HG2_1$ (FIG. 5A) close and in combination with closed contact $TG_1$ briefly energize the track end relay TE.

Contact $TE_1$ (FIG. 6) opens in the energizing path of the primary thermal relay PTH and primary timer relay PT1 and interrupts primary timing. Contact $TE_3$ (FIG. 5C) opens in the energizing path of the control relay CO1, but the relay remains energized through closed contact $CO1_3$ and resistor R6. In addition, contact $TE_2$ closes and completes an energization path for the station identification relay SI, the path including closed contacts $SI_9$, $CO1_2$, $AR_1$, $TE_2$, $DA_5$, and $CO2_1$.

Contact $SI_{11}$ (FIG. 4) closes and in combination with closed contacts $ST_6$, $DA_1$, and $EX_1$ connects the ring conductor to the hybrid coil HC, and contact $SI_{12}$ closes and in combination with closed contacts $ST_7$, $DA_2$, and $EX_2$ connects the tip conductor to the hybrid coil. In addition, contacts $SI_4$ and $SI_5$ open to remove the pulsing path from across the telephone line, and contact $SI_{13}$ opens to remove resistor R7 from the line circuit, resistor R7 performing a balancing function during dialing.

Contact $SI_3$ (FIG. 6) opens and contact $SI_{14}$ closes to remove contacts $TE_1$, $AI1_5$, and $AL2_5$ from the primary timing energization path, and contact $SI_{15}$ closes in the energizing path of the timeout relay TO4. Contact $SI_7$ (FIG. 3) opens, terminating the energization of the head relay H1 and contact $SI_{16}$ closes and in combination with closed contacts $AR_3$ and $ST_{14}$ energizes head relay H2. Contact $H1_1$ opens and contact $H2_1$ closes and the head HD2 is then connected to the preamplifier PA.

The head HD2 scans track 2 of the tape (FIG. 3A) and the station identification message recorded on track 2 is transmitted out on the telephone line through the tape to line amplifier TL (FIG. 3) and the line circuit (FIG. 4).

Failure to receive report command signal

If for some reason the supervisory station does not answer, such as because the line is busy or the call is not properly completed by the central office, then primary timing will run its course. In the same manner as described in the section "Failure to Receive Dial Tone," when primary timing is completed, the timeout relays TO1, TO2, and TO3 (FIG. 6) are energized in sequence, the energization of the timeout relay TO2 deenergizing the timeout relay TO1.

The energization of the timeout relay TO3 opens contact $TO3_3$ in the primary timing circuit to terminate primary timing and closes contact $TO3_8$ in the secondary timing circuit to initiate secondary timing. In addition, it closes contact $TO3_2$ in the energizing path of the timeout relay TO4 and contact $TO3_9$ in the energizing path of the release relay RL.

Then the next time that the track end tone on track 2 (FIG. 3A) is scanned, whereby in the manner hereinbefore described the track end relay TE is energized, contact $TE_4$ (FIG. 6) briefly closes and in combination with closed contact $TO3_9$ energizes the release relay RL. In addition, contact $TE_5$ briefly opens in the energizing path of secondary thermal and timing relays STH and STI and resets secondary timing to prevent secondary timeout.

The brief energization of the release relay RL serves to open contact $RL_1$ (FIG. 5C) thereof and deenergize the start relay ST. Contacts $ST_3$ and $ST_4$ (FIG. 4) thereupon close and contacts $ST_6$ and $ST_7$ open to drop the telephone line. In addition, contacts $ST_{13}$ and $ST_{14}$ (FIG. 3) open and respectively deenergize the tape deck solenoid DS to stop the tape and deenergize the head relay H2 to disconnect the head HD2 from the preamplifier PA. Contact $ST_{15}$ also opens and deenergizes the preamplifier PA, the tape to line amplifier TL, the tape to control amplifier TC, and the line to control amplifier LC, and contact $ST_{10}$ (FIG. 5B) opens and deenergizes the multifrequency receiver MFR. Finally, contact $ST_{11}$ (FIG. 6) opens and terminates secondary timing, and contact $ST_2$ closes and in combination with the thermistor TM and closed contact $TO3_2$ completes the energizing path of the timeout relay TO4.

After approximately two seconds, the thermistor TM $TO4_2$ closes and shunts the thermistor TM. Contact $TO4_1$ opens and deenergizes the timeout relays TO2 and TO3, and contact $TO4_3$ (FIG. 5C) opens and deenergizes the station identification relay S1. This results in contacts $TO3_2$ and $S1_{15}$ (FIG. 6) opening to deenergize the timeout relay TO4, and contacts $S1_1$ and $S1_2$ (FIG. 4) closing and reseizing the telephone line. Another attempt at calling the supervisory station is thereby initiated.

Receiving of report command

When the supervisory station answers the call from the telephone reporting set, the station identification message (FIG. 3A) is heard. The supervisory station is thereby informed of the source of the call, and after this information has been noted, the supervisory station transmits the report command signal by briefly depressing the digit one button of the Touch-Tone dial associated therewith.

The report command signal is received by the line circuit (FIG. 4) and introduced into the multifrequency receiver MFR (FIG. 5B). The multifrequency receiver MFR responds to this command signal by briefly energizing the low group relay LG1 and high group relay HG1. The contacts $LG1_1$ (FIG. 5C) and $HG1_1$ briefly close and in combination with closed contact $AR_5$ energize the alarm report relay AR, and the contact $LG1_2$ and $HG1_2$ briefly close and in combination with closed contact $RR_2$ energize the report repair relay RR.

The energization of the alarm report relay AR closes contact $AR_6$ which in combination with closed contact $TO4_3$ provides a second energizing path for the alarm report relay AR, contact $AR_5$ opening to interrupt the first energizing path. Thus the alarm report relay AL remains energized when the contacts $MG1_1$ and $LG1_1$ reopen. Furthermore, contacts $AR_1$ and $AR_2$ open and contacts $AR_7$ and $AR_8$ close in the energizing paths of the control relays $CO_1$ and $CO_2$, and contact $AR_9$ closes in the energizing path of the repair relay RP.

Contact $AR_{10}$ (FIG. 3) closes and shorts the tape to line amplifier TL, and transmission of the station identification message is thereupon terminated. Contact $AR_3$ opens and deenergizes the head relay H2, and contact $AR_{11}$ closes and in combination with closed contacts $CO2_2$ and $AL2_{14}$ energizes the head relay 114. Contact $H2_1$ thereupon opens to disconnect head HD2 from the preamplifier PA, and contact $H4_1$ closes to connect head HD4 to the preamplifier. The scanning of track 2 of the tape (FIG. 3A) is thereby terminated and the scanning of track 4 initiated.

Contact $AR_{12}$ (FIG. 2A) closes in the energizing path of the steering relay SR, and contact $AR_{12}$ closes in the energizing paths of the stepping chain relays SC1 through SC10. In addition, contact $AR_{14}$ (FIG. 2B) closes in the energizing path of the group transfer relay GT, and contact $AR_{15}$ (FIG. 5A) closes in the energizing path of the tone guard relay TG. Finally, contact $AR_4$ opens and contact $AR_{16}$ closes to respectively remove the pulsing relay P from and connect the time slot relay TS into an energizing path responsive to the closure of contacts $HG3_1$ and $LG3_1$.

The energization of the report relay RR (FIG. 5C) closes contact $RR_3$ which in combination with closed contacts $TS_1$ and $RL_2$ provides a second energization path for the relay, contact $RR_2$ opening to interrupt the first energization path. Thus the report repair relay remains energized when the contacts $HG1_2$ and $LG1_2$ reopen.

Contact $RR_1$ (FIG. 6) opens in the energizing path of the primary thermal and timer relays PTH and PTI and terminates primary timing. In addition, contact $RR_4$ (FIG. 5) opens and interrupts the transmission path between the telephone line and the multifrequency receiver MFR, terminating the report command signal input to the multifrequency receiver, and contact $RR_5$ closes and places resistor R8 into the circuit to provide impedance matching.

The scanning of track 4 commences, and the multifrequency receiver MFR (FIG. 5B) responds to each time slot tone by briefly energizing the low group relay LG3 and high group relay HG3. Contacts $LG3_1$ and $HG3_1$ (FIG. 5A) close and in combination with closed contact $AR_{16}$ briefly energize the time slot relay TS. Contact $TS_2$ (FIG. 3) opens and interrupts the short across the tape to line amplifier TL. As a result, the time slot tone is transmitted out on the line to he supervisory station during the brief time that the time slot relay TS is operated. This informs the supervisory station that the reporting set has responded to the report command signal.

In addition, contact $TS_1$ (FIG. 5C) opens in the energizing path of the report repair relay RR, and thus the first time slot tone following the report command signal deenergizes the report repair relay. Contact $RR_1$ (FIG. 6) recloses and reinitiates primary timing, and contact $RR_4$ (FIG. 4) recloses and reconnects the line to control amplifier LC to the input of the multifrequency receiver MFR, contact $RR_5$ reopening to remove the impedance matching resistor R8 from the circuit. Further command signals from the supervisory station can then be received by the multifrequency receiver MFR.

Finally, contact TS3 (FIG. 5A) closes and energizes the noise guard relay NG, contact $NG_1$ (FIG. 3) closing to place an impedance matching resistor R9 across the input of the multifrequency receiver MFR and contact $NG_2$ opening to interrupt the connection of the tape to control amplifier TC to the multifrequency receiver. Although the contact $TS_3$ (FIG. 5A) only remains closed for about 40 milliseconds, the noise guard relay NG remains energized for about 2.8 seconds, the time required to discharge capacitor C3 through resistors R10 and R11. Thus the noise guard relay NG essentially prevents the recorded messages on the alarm tracks from being transmitted to the multifrequency receiver MFR. This prevents the voice announcements on the tape from interfering with any command signal that may come from the line.

When the end of track 4 (FIG. 3A) is reached, the track end tone is transmitted to the multifrequency receiver MFR, and in the manner described above, this results in the brief energization of the track end relay TE. Contact $TE_2$ (FIG. 5C) closes and in combination with closed contacts $CO2_3$, $AR_7$ $DA_5$, and $CO2_1$ completes an energization path for the control relay CO1. The control relay CO1 is energized, and contact $CO1_4$ closes and in combination with closed contacts $ST_9$, $AR_8$, $AL2_7$, and $AL1_7$ and control relay CO2 completes a second energizing path for the control relay CO1. The first path, however, shorts the second path, and the control relay CO2 is not energized.

The energization of the track end relay TE also closes contact $TE_7$ (FIG. 2A) and opens contact $TE_8$. Closed contact $TE_7$ in combination with closed contacts $AR_{12}$ and $SC1_1$ through $SC10_1$ energize the steering relay SR, closing contacts $SR_1$ and $SR_2$ and opening contact $SR_3$. Finally, the energization of the track end relay TE closes contact $TE_6$ (FIG. 5A) which in combination with closed contacts $AR_{15}$ and $TG_2$ energize the tone guard relay TG. Contact $TG_3$ thereupon closes and in combination with closed contacts $TO4_4$ and $TS_4$ provides an alternate energization path for the tone guard relay TG, contact $TG_2$ opening to interrupt the first path. In addition, contact $TG_1$ opens and interrupts the energization path of the track end relay TE. This prevents the track end relay TE from being repetitively energized should, in the manner hereinafter described, there be a switch in the track being scanned and a repetitive input of the track end tone result therefrom.

Upon the deenergization of the track end relay TE, contact $TE_2$ (FIG. 5C) reopens to interrupt the first energization path of the control relay CO1, and the control relay CO1 is then energized through the control relay CO2. Contacts $CO2_1$ and $CO2_3$ then open in the first energizing path of the control relay CO1 and contacts $CO2_4$ and $CO2_5$ close in a second energizing path of the control relay CO2.

In addition, contact $CO2_6$ (FIG. 3) closes and contact $CO2_2$ opens to respectively energize the head relay H3 and deenergize the head relay H4. Contact $H3_1$ closes and contact $H4_1$ opens to respectively connect the head HD3 to and disconnect the head HD4 from the preamplifier PA. Track 3 of the tape (FIG. 3A) is thereupon scanned.

Finally, contact $CO2_7$ (FIG. 2B) closes and in combination with closed contacts $AL1_{12}$ and $AR_{14}$ energizes the group transfer relay GT. Contacts $GT_1$ through $GT_8$ (FIG. 2A) close and contacts $GT_{11}$ through $GT_{18}$ open to connect the first group of alarm switches AS1 through AS8 into and disconnect the second group of alarm switches AS11 through AS18 from the circuit of the alarm gate relay AG. Also, contact $GT_9$ (FIG. 2B) closes and contact $GT_{10}$ opens in the circuit of the alarm gate relay AG.

The deenergization of the track end relay TE also recloses contact $TE_8$ (FIG. 2A) and reopens contact $TE_7$. The reclosing of the contact $TE_8$ provides a second energization path for the steering relay SH through closed contacts $SR_1$ $SC1_2$ through $SC10_2$, $TO4_5$ and $TE_8$ while the reopening of contact $TE_7$ interrupts the first energization path.

Transmission of alarm report

The head HD3 (FIG. 3) then scans the first time slot tone on track 3, and in the manner described above this results in the brief energization of the time slot relay TS. Contact $TS_2$ opens and interrupts the short across the tape to line amplifier TL long enough to permit the time slot tone to be transmitted out on the line to the supervisory station, but not long enough to permit the recorded message following the time slot tone to be transmitted. Contact $TS_3$ (FIG. 5A) closes and energizes the noise guard relay NG, and as described above, it remains energized long enough to block the transmission of the recorded message following the time slot tone to the multifrequency receiver MFR. Also, contact $TS_4$ opens and deenergizes the tone guard relay TG to reclose the contact $TG_1$ in the energizing path of the track end relay T2, and contact $TS_5$ (FIG. 2A) closes and in combination with closed contacts $SC1_5$, $SR_2$, and $AR_{13}$ energizes the stepping chain relay SC1.

Contact $SC1_3$ closes and in combination with closed contacts $TS_5$ and $AR_{13}$ provide an alternate energizing path for the steering relay SR, and contact $SC1_2$ opens to interrupt the previous energizing path. Thus the steering relay SR remains energized until the time slot relay TS is deenergized and the contact $TS_5$ reopens. Contact $SC1_4$ closes and in combination with closed contacts $SC2_2$ through $SC10_2$, $TO4_5$, and $TE_8$ provides a second energization path for the stepping chain relay SC1, while contact $SC1_5$ opens to interrupt the first energization path. Thus the stepping chain relay SC1 remains energized after the time slot relay TS is deenergized and the contact $TS_5$ reopens.

Contact $SC1_6$ opens in an energizing path of the stepping chain relay SC3, and contact $SC1_7$ closes in an energizing path of the stepping chain relay SC2. Futhermore, contact $SC1_8$ (FIG. 2B) closes in the energizing path of the alrm gate relay AG. However, since the alarm switch AS1 is not closed, the alarm gate relay AG is not energized. Thus, the tape to line amplifier TL (FIG. 3) is shorted out when the head HD3 subsequently scans the alarm report recorded in the first time slot (FIG. 3A), and the message is not transmitted to the supervisory station.

The head HD3 thereafter scans the second time slot tone on track 3, and the time slot relay TS is again briefly energized. This time the brief closure of the contact $TS_5$ serves to energize the stepping chain relay SC2, the energizing path consisting of the closed contacts $SC2_5$, $SC1_7$, $SR_3$, $TS_5$, and $AR_{13}$. Contact $SC2_3$ closes and in combination with closed contacts $SC1_4$, $TS_5$, and $AR_{13}$ provides an energizing path for the stepping chain relay SC1 that keeps the relay operated until the contact $TS_5$ opens shortly thereafter, contact $SC2_2$ opening to interrupt the previous energizing path.

Contact $SC2_4$ closes and in combination with closed contacts $SC3_2$ through $SC10_2$, $TO4_5$, and $TE_8$ provides an energizing path for the stepping chain relay SC2 that is not interrupted by the opening of the contact $TS_5$, contact $SC2_5$ opening to interrupt the previous energizing path. Contact $SC2_6$ opens in an energizing path of the stepping chain relay SC4 and contact $SC2_7$ closes in an energizing path of the stepping chain relay SC3. Lastly, contact $SC2_8$ opens (FIG. 2B) and contact $SC2_9$ closes in the energizing path of the alarm gate relay AG.

Since the alarm switch AS2 (FIG. 2A) is closed, the alarm gate relay AG is energized, the energizing path comprising in addition to the alarm switch AS2 closed contacts $GT_2$, $SC2_9$ (FIG. 2B), and $SC3_8$ through $SC10_8$. Contact $AG_1$ (FIG. 3) thereupon opens and interrupts the short across the tape to line amplifier TL. The alarm report recorded in the second time slot (FIG. 3A) is transmitted out on the line and the supervisory station is informed that circuit breaker 2 is open.

In the same manner as above, each of the stepping chain relays SC3 through SC10 is operated in sequence by the time slot tone recorded in the associated time slot, and where the energization of a stepping chain relay results in the energization of the alarm gate relay AG, the message recorded in the associated time slot is transmitted to the supervisory station. Thus when the stepping chain relay SC8 is energized responsive to the time slot tone in the eighth time slot, the alarm gate relay AG is again energized, the path comprising closed alarm switch AS8 (FIG. 2A) and closed contacts $GT_8$, $SC8_9$ (FIG. 2B), $SC9_8$, and $SC10_8$, and the supervisory station is informed (FIG. 3A) that circuit breaker 8 is open.

When the end of track 3 is reached, the track end tone is transmitted to the multifrequency receiver MFR, and the track end relay TE is briefly energized responsive thereto. Contact $TE_2$ (FIG. 5C) closes and in combination with closed contacts $CO2_5$, $AR_7$, $DA_5$, $CO2_4$, and resistor R12 provides an energizing path for the control relay CO2 that shorts the previous energizing path through the control relay CO1. The control relay CO1 is therefore deenergized and contact $CO1_4$ reopens to prevent the relay from being reenergized when the contact $TE_2$ reopens.

As at the end of track 4, the energization of the track end relay TE also closes contact $TE_6$ (FIG. 5A), energizing the tone guard relay TG to prevent a double input of the track end tone, and closes contact $TE_7$ (FIG. 2A), energizing the steering relay SR to prepare for another sequential operation of the stepping chain relay SC1 through SC10. Furthermore, contact $TE_8$ opens to deenergize the stepping chain relay SC10.

Upon the deenergization of the track end relay TE, contact $TE_2$ (FIG. 5C) reopens and deenergizes the control relay CO2. Contacts $CO2_1$ and $CO2_3$ reclose and contacts $CO2_4$ and $CO2_5$ reopen in the energizing paths of the control relays CO1 and CO2. Contact $CO2_2$ (FIG. 3) recloses and in combination with closed contacts $ST_{14}$, $AR_{11}$, and $AL2_{14}$ energizes head relay H4, contact $CO2_6$ reopening to deenergize the head relay H3. Contact $H4_1$ closes and contact $H3_1$ opens to respectively connect the head HD4 to and disconnect the head HD3 from the preamplifier PA, and the scanning of the tape is switched from track 3 to track 4. Also contact $CO2_7$ (FIG. 2B) opens and deenergizes the group transfer relay GT, contacts $GT_{11}$ through $GT_{18}$ (FIG. 2A) reclosing and contacts $GT_1$ through $GT_8$ reopening to respectively connect the second group of alarm switches AS11 through AS 18 into and disconnect the first group of alarm switches AS1 through AS8 from the circuit of alarm gate relay AG.

The deenergization of the track end relay TE further recloses contact $TE_8$ and reopens contact TE. As at the end of track 4, the reclosing of the contact $TE_8$ provides a second energization path for the steering relay SR through closed contacts $SR_1$, $SC1_2$ through $SC10_2$, $TO4_5$, and $TE_8$, and the reopening of contact $TE_7$ interrupts the first energization path.

As the head HD4 scans track 4 of the tape, the stepping chain relays SC1 through SC10 are operated in sequence in the same manner as described above. When the stepping chain relay SC2 is energized, contact $SC2_9$ closes and in combination with the closed alarm switch AS12 and closed contacts $GT_{12}$, and $SC3_8$ through $SC10_8$ (FIG. 2B) energizes the alarm gate relay AG. The short across the tape to line amplifier TL (FIG. 3) is removed and the message recorded in the twelfth time slot (FIG. 3A) is transmitted out on the telephone line informing the supervisory station that circuit breaker 12 is open. In addition, when the stepping chain relay SC9 is energized, contact $SC9_9$ (FIG. 2B) closes and in combination with closed contacts $SC10_8$, $GT_{10}$, $AL1_{11}$, and $AL2_{12}$ again energizes the alarm gate relay AG. This time the short across the tape to line amplifier TL is removed to permit the message recorded in the nineteenth time slot (FIG. 3A) to be transmitted out on the telephone line and thereby inform the supervisory station that this is the end of the alarm report.

In the same manner as described in the section entitled "Receiving of Dial Tone," when the end of track 4 is reached, the track end tone causes the scanning of the tape to be switched from track 4 to track 3 and the entire alarm reporting sequence starts all over again. Thus, if the supervisory station does nothing, the reporting set will continue to repeat the alarm report until primary timing is completed, at which point the reporting set will drop the telephone line and again call the supervisory station. The supervisory station can, on the other hand, prevent primary timeout by again transmitting the report command signal or by transmitting the repair command signal.

Receiving of repair command signal

If the supervisory station wishes to attempt to correct the alarm conditions that exist at the site of the telephone reporting set, the repair command signal is transmitted by depressing the digit 2 button of the Touch-Tone dial of the supervisory station. The multifrequency receiver MFR (FIG. 5B) responds to this command by briefly energizing the low group relay LG1 and high group relay HG2. The contacts $LG2_1$ and $HG2_2$ (FIG. 5C) close and in combination with closed contact $AR_9$ energize the repair relay RP. As a result, contact $RP_1$ (FIG. 7) closes and initiates the operation of the subscriber's repair equipment, which in the present embodiment attempts to close the open circuit breakers.

The contacts $LG2_2$ and $HG2_3$ (FIG. 5C) also close and energize the report repair relay RR. In the same manner as described in the section entitled "Receiving of Report Command Signal," the energization of the report repair relay terminates primary timing and interrupts the transmission path between the telephone line and the multifrequency receiver MFR to terminate the repair command signal. The report repair relay is then deenergized by the subsequent time slot tone, and primary timing is reinitiated and the multifrequency receiver MFH reconnected to the telephone line.

Successful repair of alarm conditions

If the alarm conditions are successfully repaired by the equipment of the subscriber, whereby the circuit breakers 2, 8, and 12 are reclosed, the alarm switches AS2 (FIG. 2A), AS8, and AS12 reopen. Then when the capacitor C1 discharges through the resistors R1 and R2 the alarm relay AL1 is deenergized and when the capacitor C2 discharges through the resistors R3 and R4 the alarm relay AL2 is deenergized.

Contacts $AL1_8$ and $AL2_8$ (FIG. 6) reclose in an energizing path of the release relay RL; contacts $AL1_9$ (FIG. 2B), $AL1_{10}$, $AL2_9$, and $AL2_{10}$ reclose and contacts $AL1_{11}$, $AL2_{11}$, and $AL2_{12}$ reopen in the energizing path of the alarm gate relay AG; and contacts $AL1_4$ and $AL2_4$ (FIG. 3) reopen in the energizing path of the motor relay M. In addition, contact $AL2_{15}$ recloses in the energizing path of the head relay H3 and contact $AL2_{14}$ reopens in the energizing path of the head relay H4 with the result that track 3 is thereafter scanned.

The time slot tones continue to operate the stepping chain relays SC1 through SC10 (FIG. 2A) in sequence, but since none of the alarm switches AS1 through AS18 are closed, the operation of the stepping chain relays SC1 through SC8 does not result in the energization of the alarm gate relay AG (FIG. 2B). Furthermore, the operation of the stepping chain relay SC9 and the resultant closure of the contact $SC9_9$ also does not result in the energization of the alarm gate relay AG. Thus, no alarm messages and no end of report message is transmitted to the supervisory station. When, however, the stepping chain relay SC10 is energized and the contact $SC10_9$ closes, it combines with closed contacts $AL1_9$ and $AL2_9$ to energize the alarm gate relay AG. Contact $AG_1$ (FIG. 3) opens and removes the short from across the tape to line amplifier TL. The message recorded in the tenth time slot is transmitted out on the telephone line and the supervisory station is informed that all the circuits are reclosed.

Immediately thereafter, the track end tone on track 3 briefly energizes the track end relay TE resulting, in the manner described above, in the deenergization of the stepping chain relay SC10 (FIG. 2A) and the energization of the steering relay SR and the tone guard relay TG (FIG. 5A). In addition, contact $TE_4$ (FIG. 6) closes and in combination with closed contacts $AL1_8$ and $AL2_8$ briefly energize the release relay RL. Contact $RL_1$ (FIG. 5C) thereupon opens and deenergizes the start relay ST.

Contacts $ST_3$ and $ST_4$ (FIG. 4) close and contacts $ST_6$ and $ST_7$ open to drop the telephone line, and contact $ST_{10}$ (FIG. 5B) opens to deenergize the multifrequency receiver MFR. In addition, contact $ST_{12}$ (FIG. 3) opens and deenergizes the motor relay M, contacts $M_1$ and $M_2$ opening to deenergize the tape deck motor DM, and contact $ST_{13}$ opens and deenergizes the tape deck solenoid DS. The tape is thereby halted at the beginning of the tracks recorded thereon. Contact $ST_{14}$ also opens and deenergizes the head relay H3 to disconnect the head HD3 from the preamplifier PA, and contact $ST_{15}$ opens and deenergizes the preamplifier PA, the tape to line amplifier TL, the tape to control amplifier TC, and the line to control amplifier LC (FIG. 4).

Furthermore, contact $ST_8$ (FIG. 5C) opens to prevent the energization of the start relay ST upon the subsequent reclosure of the contact $RL_1$, and contact $ST_5$ closes to allow for energization of the start relay ST responsive to the occurrence of a new alarm condition. Lastly, contact $ST_2$ (FIG. 6) closes and in combination with the thermistor TM and closed contact $SI_{15}$ completes the energizing path of the timeout relay TO4.

After approximately two seconds, the thermistor TM conducts and energizes the timeout relay TO4, contact $TO4_2$ closing to shunt the thermistor. Contact $TO4_5$ (FIG. 2A) opens to denergize the steering relay SR and contact $TO4_4$ (FIG. 5A) opens to deenergize the tone guard relay TG. In addition contact $TO4_3$ (FIG. 5C) opens to deenergize the station identification relay SI and the alarm report relay AR. Contact $SI_{15}$ (FIG. 6) then opens to deenergize the timeout relay TO4, and the reporting set is reset to a standby condition ready to respond to the occurrence of any further alarm condition.

Unsuccessful repair of alarm conditions

If the alarm conditions are not completely corrected by the repair equipment (FIG. 7) of the subscriber, as for example, circuit breaker 12 being reclosed but circuit breakers 2 and 8 remaining open, the supervisory station is informed of this fact by the continued transmission of the alarm reports with respect to the remaining open circuit breakers.

Thus alarm switch AS12 opens and deenergizes the alarm relay AL2 and contacts $AL2_9$ and $AL2_{10}$ close and contacts $AL2_{11}$ and $AL2_{12}$ open in energizing paths of the alarm gate relay AG. In addition, contact $AL2_{13}$ closes and in combination with closed contacts $AL1_{12}$ and $AR_{14}$ energizes the group transfer relay GT (FIG. 2B), closing contacts $GT_1$ (FIG. 2A) through $GT_9$ and opening contacts $GT_{10}$ through $GT_{18}$ in energizing paths of the group transfer relay GT. Finally, contact $AL2_7$ (FIG. 5C) opens in the energizing path of the control relay CO2 and contact $AL2_{15}$ (FIG. 3) closes and contact $AL2_{14}$ opens in the respective energizing paths of the head relays H4 and H3, the head relay H3 being energized through a path comprising closed contacts $AL2_{15}$, $CO2_2$, $AR_{11}$, and $ST_{14}$. As a result only track 3 is thereafter scanned and in the manner described in the section entitled "Transmission of Alarm Report" the supervisory station is informed that circuit breakers 2 and 8 are open.

Furthermore, when the stepping chain relay SC9 is energized, the alarm gate relay AG is energized through a path comprising closed contacts $SC10_8$, $SC9_9$, $GT_9$, and $AL2_{10}$. The short across the tape to line amplifier TL is removed by the opening of the contact $AG_1$ and the message in the ninth time slot is transmitted out on the telephone line informing the supervisory station that the report is completed.

The supervisory station may repeat the repair command signal to reinitiate the operation of the subscriber's repair equipment in the hope of correcting the remaining alarm conditions, but if this is still unsuccessful the disable command signal is transmitted to deactivate the reporting set.

Receiving of disable command signal

The disable command signal is transmitted by the supervisory station by depressing the digit 3 button of the Touch-Tone dial of the station. The multifrequency receiver MFR (FIG. 5B) responds to this command by briefly energizing the low group relay LG1 and the high group relay HG3. The contacts $LG1_3$ and $HG3_2$ (FIG. 5C) close and in combination with closed contacts $DA_6$ energize the disable relay DA. Contact $DA_7$ thereupon closes and in combination with closed contact $AL2_6$ or $AL1_6$ provides a second energizing path for the disable relay DA, contact $DA_6$ opening to interrupt the first path. The disable relay DA therefore remains energized until the alarm conditions are corrected and both the alarm relays AL1 and AL2 are deenergized.

Contact $DA_8$ closes to illuminate a disable lamp DAL, the illuminated lamp providing a visual indication to any one servicing the telephone reporting set that the set has been disabled by the supervisory station. Contact $DA_5$ opens in an energizing path of the control relays CO1 and CO2, and contact $DA_9$ closes in an energizing path of the deactivate relay DE. Contact $DA_4$ (FIG. 6) opens and terminates primary timing, while contact $DA_{10}$ closes and in combination with closed contact $STI_1$, $TE_5$, and $ST_{11}$ energizes the secondary thermal relay STH to initiate secondary timing. Contact $DA_{11}$ closes in the energizing path of the release relay RL, and contact $DA_3$ (FIG. 3) opens in the energizing path of the motor relay M. Finally, contacts $DA_1$ and $DA_2$ (FIG. 4) respectively open in the paths of the ring and tip conductors, and the telephone line is dropped.

When the end of the track is reached, the track end tone briefly energizes the track end relay TE which in turn deenergizes the stepping relay SC10 (FIG. 2A) and energizes the steering relay SR and the tone guard relay TG (FIG. 5A). Furthermore, contact $TE_4$ (FIG. 6) closes and in combination with closed contact $DA_{11}$ briefly energizes the release relay RL. Contact $RL_1$ (FIG. 5C) is thereby opened and the start relay ST is deenergized.

Contact $ST_{12}$ (FIG. 3) opens and deenergizes the motor relay M, contacts $M_1$ and $M_2$ opening to deenergize the tape deck motor DM, and contact $SD_{13}$ opens and deenergizes the tape deck solenoid DS. The tape is thereby halted at the beginning of the tracks recorded thereon. Contact $ST_{14}$ also opens and deenergizes the energized head relay H3 or H4 to disconnect it from the preamplifier PA, and contact $ST_{15}$ opens and deenergizes the preamplifier PA, the tape to line amplifier TL, the tape to control amplifier TC, and the line to control amplifier LC (FIG. 4).

Contact $ST_{10}$ (FIG. 5B) opens to deenergize the multifrequency receiver MFR, and contact $ST_8$ (FIG. 5C) opens to prevent the energization of the start relay ST upon the subsequent reclosure of the contact $RL_1$. Contact $ST_{11}$ (FIG. 6) opens and terminates secondary timing, while contact $ST_2$ closes and in combination with thermistor TM and closed contact $SI_{15}$ completes the energizing path for the timeout relay TO4.

After approximately two seconds, the thermistor TM conducts and energizes the timeout relay TO4, contact $TO4_2$ closing to shunt the thermistor. Contact $TO4_5$ (FIG. 2A) opens to deenergize the steering relay SR, and contact $TO4_4$ (FIG. 5A) opens to deenergize the tone guard relay TG. In addition, contact $TO4_3$ (FIG. 5C) opens to deenergize the station identification relay SI and the alarm report relay AR.

The telephone reporting set is at this point in a disabled condition unable to respond to the occurrence of any new alarm condition. This is because the open contacts $DA_1$ and $DA_2$ (FIG. 4) prevent the telephone line from being seized, and open contact $DA_3$ (FIG. 3) prevents the motor relay M from being energized. When the existing alarm conditions are corrected, the alarm relays AL1 and AL2 (FIG. 2A) will both be deenergized, and the contacts $AL1_6$ and $AL2_6$ (FIG. 5C) will both be open whereby the disable relay DA will be deenergized. Contacts $DA_1$, $DA_2$, and $DA_2$ will all close and the reporting set will then be reset to a standby condition.

Breakdown of reporting set

After the opening of the reporting set has been initiated by the occurrence of an alarm condition, should the magnetic tape break or some other failure occur that prevents the scanning of the tape, the reporting set deactivates itself.

Thus, if the failure occurs prior to the transmission of station identification, primary timeout occurs in the manner set forth in the description of the timing circuit (FIG. 6) because of no track end signal. If, on the other hand, the failure occurs during or after the transmission of station identification, primary timeout occurs because of no report or repair command signals. These command signals will be absent because if the failure occurs before the supervisory station answers, the supervisory station will not be aware that the call has been originated by a telephone reporting set, and if the failure occurs after the supervisory station answers, the supervisory station will appreciate that a failure of the aforementioned nature has occurred.

At the completion of primary timing, the open contact $PTH_1$ closes and in combination with the closed contacts $PT1_3$ and $TO2_1$ energizes the timeout relay TO1. Contact $TO1_1$ is thereby closed and in combination with closed contacts $TO4_1$, $TO3_4$, $TO3_5$, and resistor R5 completes the energization path of the timeout relay TO2.

The energized relay TO2 opens contact $TO2_1$ to deenergize the timeout relay TO1 and close contact $TO2_2$ to combine with closed contact $TO4_1$ to energize the timeout relay TO3, contact $TO1_1$ reopening to interrupt the previous energizing path of the timeout relay TO2. Contacts $TO3_1$ and $TO3_7$ close and contacts $TO3_4$ and $TO3_5$ open to prepare another energization path for the timeout relay TO3. Contact $TO3_3$ opens and deenergizes the primary timer relay PT1 and contact $TO3_8$ closes and in combination with close contacts $STI_1$, $TE_5$, and $ST_{11}$ energizes the secondary thermal relay STH. Further, contact $TO3_2$ closes in the energizing path of the timeout relay TO4, and contact $TO3_{10}$ (FIG. 5C) closes in an energizing path of the deactivate relay DE.

After approximatel 11 seconds, contact $STH_1$ (FIG. 6) opens in an energization path of the timeout relay TO1, and contact $STH_2$ closes and in combination with closed contacts $TO3_8$, $TE_5$, and $ST_{11}$ energizes the secondary timer relay ST1. Contact $ST1_2$ thereupon closes to shunt the contact STH and contact ST1 opens to deenergize the secondary thermal relay STH. In addition, contact $ST1_3$ closes in an energization path of the timeout relay TO1.

Approximately 34 seconds later, the contacts $STH_1$ recloses and in combination with closed contact $STI_3$ energizes the timeout relay TO1. Contacts TO1, closes and in combination with closed contacts $TO3_6$ and $TO3_7$ provides an energizing path for the timeout relay TO3 that shorts the timeout relay TO2. The timeout relay TO2 is thereby deenergized, and contact $TO2_2$ opens to interrupt its energizing path. Furthermore, contact $TO1_2$ (FIG. 5C) closes in combination with closed contacts $TO3_{10}$ and $DE_5$ energizes the deactivate relay DE.

Contact $DE_4$ closes and in combination with a closed DE key provides an alternate energization path for the deactivate relay DE, contacts $DE_5$ opening to interrupt the previous path. Contact $DE_6$ (FIG. 4) closes and illuminates a deactivate lamp DEL to provide a visual indication to anyone servicing the telephone reporting set that the set has deactivated itself. Contacts $DE_1$ and $DE_2$ open and if the failure has occurred prior to the station identification announcement, the telephone line is dropped at this point. Contact $DE_3$ (FIG. 3) opens in one energizing path of the motor relay M, and contact $DE_7$ (FIG. 6) closes and in combination with capacitor C4 and parallel with resistor R13 briefly energizes the release relay RL. Contact $RL_1$ (FIG. 5C) thereupon opens and deenergizes the start relay ST.

In the same manner as described in the section entitled "Successful Repair of Alarm Conditions," the deenergization of the start relay ST results in the dropping of the telephone line (FIG. 4) if it has not been previously dropped and in the deenergization of the multifrequency receiver MFR (FIG. 5B), the motor relay M (FIG. 6), the tape deck motor DM, the tape deck solenoid DS, the preamplifier PA, the tape to line amplifier TL, the tape to control amplifier TC, and the line to control amplifier LC (FIG. 4). In addition, the deenergization of the start ST opens contact $ST_{11}$ (FIG. 6) to deenergize the secondary timer relay ST1 and closes contact ST2 to energize the timeout relay TO4.

The energized timeout relay TO4 acts to deenergize the station identification relay SI (FIG. 5C) and alarm report relay AR if one or both of these relays have been previously energized. Thereafter, the timeout relay TO4 (FIG. 6) is itself deenergized by the deenergization of the timeout relay TO3 and the reopening of contact $TO3_2$, the timeout relay TO3 being deenergized by the deenergization of the timeout relay TO1 and the reopening of contact $TO1_1$, and the timeout relay TO1 being deenergized by the deenergization of the secondary timer relay STI and the reopening of contact $STI_3$. The reporting set is then in a deactivated condition with only the deactivate relay DE (FIG. 5C) remaining energized. After the reporting set is repaired, the deactivate relay DE is manually deenergized by the opening of the DE key.

Although a specific embodiment of the invention has been shown and described, it will be understood that it is but illustrative and that various modifications may be made therein without departing from the scope and spirit of this invention as defined in the appended claims.

We claim:

1. A telephone reporting set comprising:
   - means responsive to the occurrence of a predetermined condition for seizing a telephone line;
   - means responsive to a [dial tone] *signal indicating that the central office is ready to receive calling signals* for calling a preselected telephone number;
   - message transmitting means;
   - means responsive to the completion of the calling of the preselected telephone number for causing the message transmitting means to transmit a message identifying the telephone reporting set making the call; and
   - means responsive to a signal from the called station while the message transmitting means is identifying the telephone reporting set for causing the message transmitting means to transmit a message indicating the occurrence of the predetermined conditions.

2. A telephone reporting set as in claim 1 further including means responsive to the expiration of a particular period of time following the seizure of the telephone line during which no [dial tone] *signal indicating that the central office is ready to receive calling signals* is received for dropping the telephone line and then reseizing it a short time later.

3. A telephone reporting set comprising:
   - means responsive to the occurrence of one or more of a multiple of alarm conditions for seizing a telephone line;
   - means for thereafter calling a supervisory station;
   - message transmitting means;
   - means operative subsequent to the calling of the supervisory station for causing the message transmitting means to transmit a message identifying the telephone reporting set making the call; and
   - means responsive to a signal from the supervisory station while the message transmitting means is identifying the telephone reporting set for causing the message transmitting means to transmit a message identifying which of the multiple alarm conditions have occurred.

4. A telephone reporting set as in claim 3 further including means responsive to a signal from the supervisory station while the message transmitting means is identifying which of the multiple alarm conditions have occurred for initiating corrective action with respect to the alarm conditions.

5. A telephone reporting set as in claim 4 wherein the message tranmitting means thereafter transmits a message indicating whether the corrective action was successful and if not successful indicating which alarm conditions still continue to exist.

6. A telephone reporting set as in claim 4 further including means for dropping the telephone line and resetting the reporting set to a standby condition if the corrective action was successful.

7. A telephone reporting set as in claim 3 further including means responsive to a particular signal from the supervisory station for dropping the telephone line and disabling the reporting set until the alarm conditions are corrected.

8. A telephone reporting set comprising:

means responsive to the occurrence of a predetermined condition for seizing a telephone line;

means for thereafter calling a preselected telephone number to establish a communication path with a particular station;

means operative subsequent to the calling of the preselected telephone number for transmitting to the called station a message indicating the occurrence of the predetermined condition; and means responsive to a signal from the called station while the message indicating the occurrence of the predetermined condition is being transmitted for initiating a particular action with respect to the predetermined condition.

9. A telephone reporting set comprising:

means responsive to the occurrence of a predetermined condition for seizing a telephone line;

means for thereafter calling a preselected telephone number;

message transmitting means;

means operative subsequent to the completion of the calling of the preselected telephone number for causing the message transmitting means to transmit a message identifying the telephone reporting set making the call; and means responsive to a signal from the called station while the message transmitting means is identifying the telephone reporting set for causing the message transmitting means to transmit a message indicating the occurrence of the predetermined condition.

10. A telephone reporting set as in claim 9 further including means responsive to a signal from the called station while the message transmitting means is indicating the occurrence of the predetermined condition for initiating a particular action with respect to the predetermined condition.

11. A telephone reporting set as in claim 10 wherein the message transmitting means thereafter provides an indication of whether the action initiated was successful.

12. A telephone reporting set as in claim 10 further including means for dropping the telephone line responsive to termination of the predetermined condition.

*13. An automatic alarm signaling system comprising:*

*a sensor for detecting the occurrence of an emergency event,*

*means responsive to actuation of the sensor for connecting the alarm signaling system to a telephone line,*

*a generator for producing telephone station calling signals,*

*a generator for producing emergency message signals,*

*means responsive to the reception of a signal indicating that the central office is ready to receive calling signals for causing telephone station calling signals to be transmitted into the telephone line,*

*means responsive to a first signal transmitted by the called station for actuating the emergency message signal generator, and*

*disconnecting means responsive to a second signal transmitted by the called station to disconnect the alarm signaling system from the telephone line.*

*14. An automatic alarm system according to claim 13, further including:*

*a latch in the disconnecting means, the latch acting to prevent the alarm system from again being connected to the telephone line until the disconnecting means is unlatched.*

References Cited

The following references, cited by the Examiner, are of record in the patented file of this patent or the original patent.

UNITED STATES PATENTS

| | | | |
|---|---|---|---|
| 2,717,986 | 9/1955 | Dimmer | 179—2 |
| 3,049,592 | 8/1962 | Waldman | 179—2 |
| 3,098,123 | 7/1963 | Stonor | 179—2 |
| 3,207,849 | 9/1965 | Andrews | 179—5 |
| 3,287,500 | 11/1966 | Moore | 179—5 |
| 3,383,467 | 5/1968 | New et al. | 179—2 |
| 3,427,402 | 2/1969 | Stokes | 179—5 |

KATHLEEN H. CLAFFY, Primary Examiner

D. L. STEWART, Assistant Examiner

U.S. Cl. X.R.

179—2 A